United States Patent
Guan et al.

(10) Patent No.: US 9,070,303 B2
(45) Date of Patent: Jun. 30, 2015

(54) LANGUAGE LEARNING OPPORTUNITIES AND GENERAL SEARCH ENGINES

(75) Inventors: Hongchao Guan, Beijing (CN); Kun Jing, Beijing (CN); Jin Shi, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 95 days.

(21) Appl. No.: 13/486,746

(22) Filed: Jun. 1, 2012

(65) Prior Publication Data

US 2013/0325833 A1 Dec. 5, 2013

(51) Int. Cl.
*G06F 7/00* (2006.01)
*G06F 17/30* (2006.01)
*G09B 19/06* (2006.01)

(52) U.S. Cl.
CPC .......... *G09B 19/06* (2013.01); *G06F 17/30867* (2013.01)

(58) Field of Classification Search
CPC . G06F 17/30; G06F 17/3053; G06F 17/3097; G06F 17/30864; G06F 17/30867
USPC ........... 707/246, 760, 706; 434/157; 715/264, 715/265
See application file for complete search history.

(56) References Cited

U.S. PATENT DOCUMENTS

| | | | |
|---|---|---|---|
| 6,438,515 B1 * | 8/2002 | Crawford et al. | 704/5 |
| 8,224,836 B1 * | 7/2012 | Piratla | 707/759 |
| 2004/0078204 A1 * | 4/2004 | Segond et al. | 704/277 |
| 2005/0197826 A1 | 9/2005 | Neeman | |
| 2006/0173829 A1 | 8/2006 | Neeman | |
| 2007/0106653 A1 * | 5/2007 | Sun | 707/4 |
| 2007/0136266 A1 * | 6/2007 | Su et al. | 707/4 |
| 2009/0024595 A1 * | 1/2009 | Chen | 707/4 |
| 2009/0024613 A1 * | 1/2009 | Niu et al. | 707/5 |
| 2009/0182547 A1 * | 7/2009 | Niu et al. | 704/2 |
| 2009/0193003 A1 * | 7/2009 | Heymans et al. | 707/3 |
| 2009/0258333 A1 * | 10/2009 | Yu | 434/157 |
| 2009/0307203 A1 * | 12/2009 | Keim et al. | 707/5 |
| 2010/0070521 A1 * | 3/2010 | Clinchant et al. | 707/760 |
| 2010/0241416 A1 | 9/2010 | Jiang et al. | |
| 2010/0250575 A1 * | 9/2010 | Lukiyanov et al. | 707/760 |

(Continued)

OTHER PUBLICATIONS

Holmes, April, "Bilingual Search for the Web", Published on: Jan. 15, 2012, Available at: http://arnoldit.com/wordpress/2012/01/15/bilingual-search-for-the-web/.

(Continued)

*Primary Examiner* — Robert Beausoliel, Jr.
*Assistant Examiner* — Nicholas Allen
(74) *Attorney, Agent, or Firm* — Dave Ream; Jim Ross; Micky Minhas (57) ABSTRACT

Methods, computer systems, and computer-readable storage media for determining that a user of a general search engine has intent to not only view search results in a native language on a general search engine results page, but also to have non-native language learning opportunities presented on the general search engine results page. The non-native language learning opportunities include a set of search results drawn from a non-native language document source and presented in the non-native language. Other opportunities include a non-native language dictionary definition of a received search query, a non-native language translation of the search query, and on-demand translation tools available on the general search engine results page.

13 Claims, 6 Drawing Sheets

(56) References Cited

U.S. PATENT DOCUMENTS

| | | | |
|---|---|---|---|
| 2010/0311030 A1* | 12/2010 | He et al. | 434/350 |
| 2011/0131485 A1* | 6/2011 | Bao et al. | 715/243 |
| 2011/0202330 A1* | 8/2011 | Dai et al. | 704/2 |
| 2012/0166174 A1* | 6/2012 | Lipetskaia | 704/3 |
| 2012/0276504 A1* | 11/2012 | Chen et al. | 434/157 |
| 2012/0329013 A1* | 12/2012 | Chibos | 434/157 |
| 2012/0330919 A1* | 12/2012 | Chen et al. | 707/706 |
| 2013/0006954 A1* | 1/2013 | Nikoulina et al. | 707/706 |

OTHER PUBLICATIONS

Wang, et al., "Exploiting the Web as the Multilingual Corpus for Unknown Query Translation", In Journal of the American Society for Information Science and Technology Archive, vol. 57, Issue 5, Mar. 2006, 33 pages.

Jansen, et al., "Determining the User Intent of Web Search Engine Queries", In Proceedings of the 16th International Conference on World Wide Web, May 8, 2007, pp. 1149-1150.

\* cited by examiner

SEARCH 中国银行
网页 更多

英文翻译模式 ～514

相关搜索
中国银行网上银行
中国银行外汇牌价
中国银行信用卡
中国银行业协会
中国银行手机电话
中国工商银行
中国银行浙江省分行
中国银行汇率查询
⎫
⎬ 516
⎭

512  1-10 条结果 共20,300,000条) 高级 安全搜索 严格

中国银行 [ZHONG GUO YIN HANG]
(英文翻译模式) 英文翻译模式

NA  1. BANK OF CHINA  ～523  ～520
1. AND IT WAS ONLY ABLE TO DO THE DEAL BECAUSE IT HAD AN
   UNUSUAL STRUCTURE – THE BONDS CARRIED A GUARANTEE
   FROM THE BANK OF CHINA. ⇩·▢
   中国银行浙江省分行 英文翻译模式 省分行 (BANK OF CHINA)左旁译(隐文英
   果 余 中国银行(BANK OF CHINA)左旁译(隐文英
2. ZHU MIN, EXECUTIVE VICE PRESIDENT OF THE BANK OF CHINA,  ～522
   SAID THE INFRASTRUCTURE CONSTRUCTION PLAN CAN
   SUPPORT NEXT YEAR'S GROWTH. ⇩·▢
   中国银行浙江省分行 英文翻译模式 省分行 英文翻 银行浙江省更多条结果

⎫
⎬ 518
⎭

中国银行信用卡
中国银行浙江省分行 英文翻译模式 省分行 英文翻 银行浙江省更多条结果
浙江省分行 英文翻译模式 省分行 英文翻 银行浙江省更多条结果
WWW.BOC.CN 浙江省分行
中国银行浙江省分行
中国银行浙江省分行 英文翻译模式 省分行 英文翻 银行浙江省更多条结果
浙江省分行 英文翻译模式 省分行 英文翻 银行浙江省更多条结果
WWW.WEBENCYCLOPEDIA.COM/BANK_OF_CHINA
中国银行业协会
浙江省分行 英文翻译模式 省分行 英文翻 银行浙江省分行
BAIKE.BAIDU.COM/VIEW/9609.HTML
⎫
⎬ 524
⎭

LANGUAGE LEARNING OPPORTUNITIES AND GENERAL SEARCH ENGINES

BACKGROUND

With growing economic globalization, more and more people are attempting to learn a second or non-native language. Opportunities for doing so are fairly limited. For example, language learners can enroll in a language course or immerse themselves in the non-native language culture. In addition, the Web offers a number of translation tools such as, for example, Google® Translate. With Google Translate, a user enters a word or phrase, and a translation in a user-selected non-native language is presented.

Although these options are effective, language learners continue to look for non-traditional ways to practice their newfound skills. One non-traditional way is to perform a general Web search using a non-native language. For example, a Chinese user attempting to learn English could access, for example, a general search engine such as Bing™ and change the language settings from Chinese to English. The Chinese user could construct a query comprised of English language words. In turn, the search engine would search English language documents and return English language search results.

However, many language learners have not achieved the aptitude to perform this type of search. These users are limited to using a general search engine in their native language or using a vertical or bilingual search engine such as, for example, 2lingual.com by Google®. A language learner using a bilingual search engine exhibits unequivocal intent to learn a non-native language or second language. For example, with 2lingual.com, the user specifically accesses the site and specifies the languages used for the search. There is currently not a general search engine that is able to recognize a user's intent to not only perform a general Web search but also to be presented with language learning opportunities on the general search engine results page.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present invention relate to systems, methods, and computer-readable storage media for, among other things, a general search engine to determine that a user has intent to not only be presented with search results on a general search engine results page but also to be presented with opportunities to learn a non-native language. The opportunities include at least presenting non-native language search results in conjunction with native language search results, presenting a dictionary definition of the search query along with a translation of the search query, and providing translation assistance tools to aid the user in translating the search results.

Accordingly, the present invention is directed to one or more computer-readable storage media having embodied thereon computer-executable instructions that, when executed by a general search engine, perform a method of providing language learning opportunities on a general search engine results page. The method comprises receiving a first search query from a user; the first search query comprises at least one or more words in native language characters or symbols. It is determined that the user has intent to have non-native language learning opportunities presented on the general search engine results page. A first set of native language search results associated with the first search query is identified. Likewise, a second set of non-native language search results associated with the first search query is also identified. Both sets of search results are presented simultaneously on the general search engine results page.

In another aspect, the present invention is directed to a graphical user interface (GUI) associated with a general search engine results page for simultaneously displaying search results in a native language and search results in a non-native language. The GUI comprises a search query input area on the general search engine results page. The search query input area is configured to receive a first native language search query inputted by a user. The GUI further comprises a bilingual search result area configured to present a first set of search results in the non-native language; the first set of search results is associated with the first search query. Further, the GUI comprises a native language search result area configured to present a second set of search results in the native language; the second set of search results is also associated with the first search query.

In yet another aspect, the present invention is directed to a computerized method carried out by a general search engine running on one or more processors for a native language user to learn a non-native language on a general search engine results page. The method comprises receiving a first search query from the native language user; the first search query comprises at least one or more words composed of native language characters or symbols. It is determined that the user has intent to have non-native language learning opportunities presented on the general search engine results page. The determining comprises at least one of receiving an indication that the user has initiated a bilingual mode, determining that the user has utilized a language learning portal, or determining that the first search query further comprises one or more words composed of non-native language characters or symbols.

Continuing, the first search query is translated into a second search query; the second search query is comprised only of one or more words in non-native language characters or symbols. A first set of native language results associated with the first search query is identified, and a second set of non-native language search results associated with the second search query is identified. Both the first and second sets of search results are simultaneously presented on the general search engine results page.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention relate to systems, methods, and computer-readable storage media for, among other things, a general search engine to determine that a user has intent to not only be presented with search results on a general search engine results page but also to be presented with opportunities to learn a non-native language. The opportunities include at least presenting non-native language search results in conjunction with native language search results presenting a dictionary definition of the search query along with a translation of the search query, and providing translation assistance tools to aid the user in translating the search results.

Figure 1:
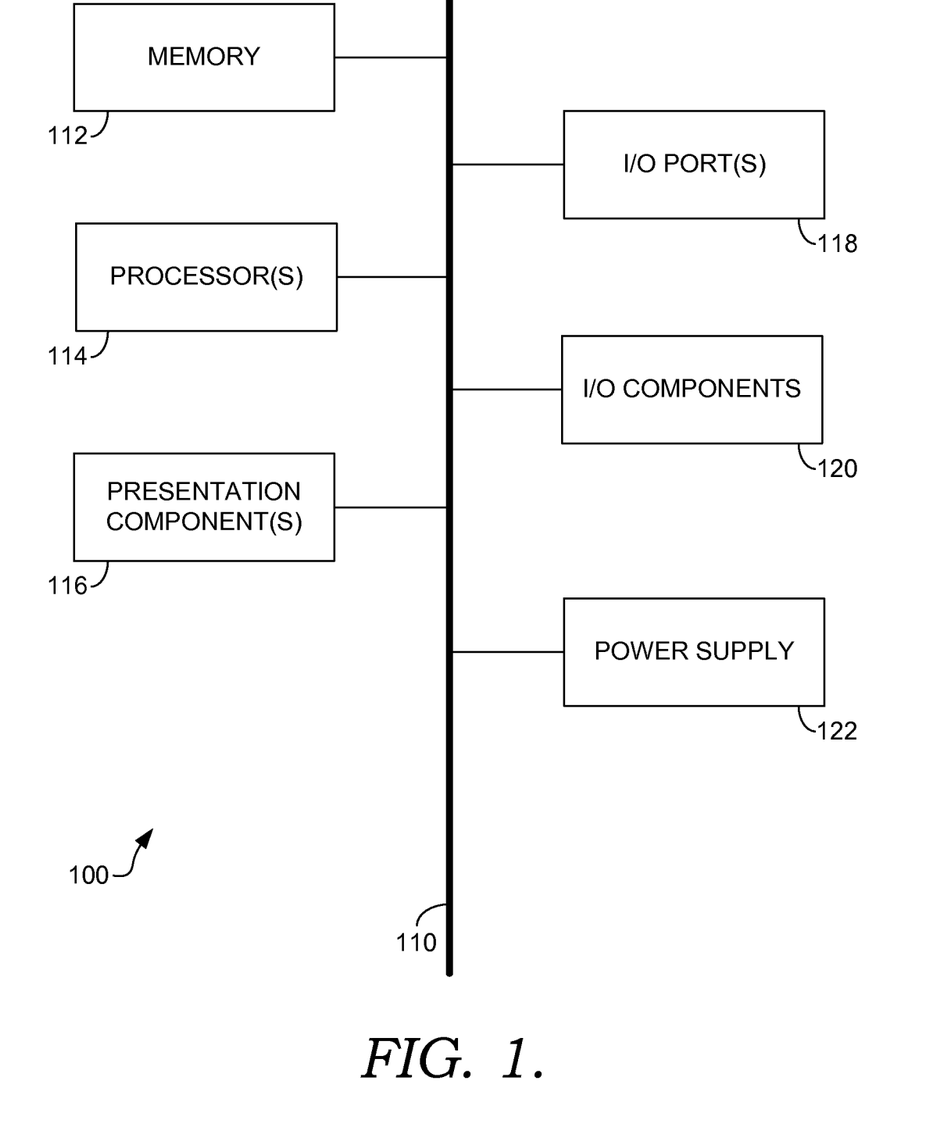
FIG. 1 is a block diagram of an exemplary computing environment suitable for use in implementing embodiments of the present invention.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a set of one or more processes distributed on one or more computers, one or more stand-alone storage devices, a set of one or more other computing or storage devices, a combination of one or more of the above, and the like.

Figure 2:
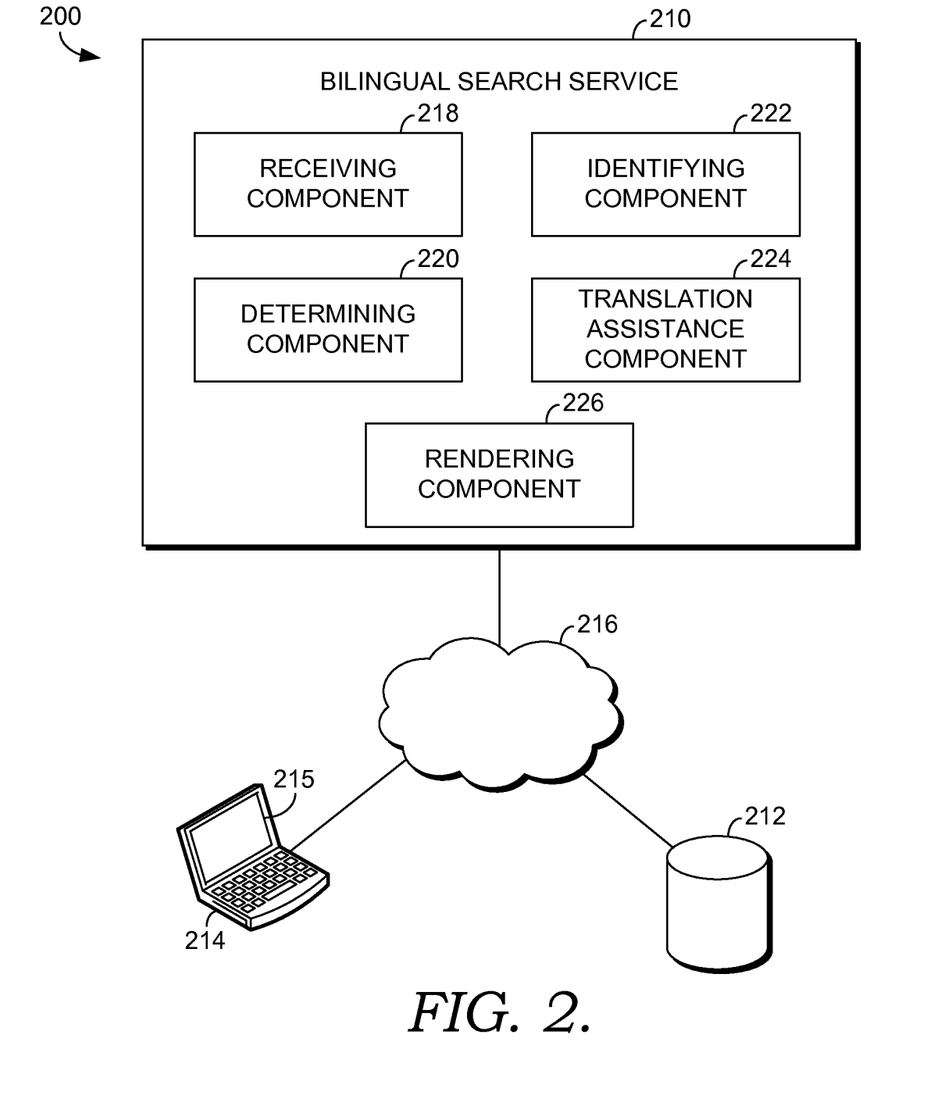
FIG. 2 is a block diagram of an exemplary system for use in presenting language learning opportunities on a general search engine results page suitable for use in implementing embodiments of the present invention.

With this as a background and turning to FIG. 2, an exemplary system 200 is depicted for use in determining user intent to have non-native language learning opportunities presented on a general search engine results page. The system 200 is merely an example of one suitable system environment and is not intended to suggest any limitation as to the scope of use or functionality of embodiments of the present invention. Neither should the system 200 be interpreted as having any dependency or requirement related to any single module/component or combination of modules/components illustrated therein.

The system 200 includes a general search engine 210, a data store 212, and an end-user computing device 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into, for example, the operating system of the end-user computing device 214 or the general search engine 210. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the general search engine 210 might reside on a server, a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 212 is configured to store information for use by, for example, the general search engine 210. The information stored in association with the data store 212 is configured to be searchable for one or more items of information stored in association therewith. The information stored in association with the data store 212 may comprise general information used by the general search engine 210. For example, the data store 212 may store information concerning recorded search behavior (query logs, browser or search logs, query click logs, etc.) of users in general, and a log of a particular user's tracked interactions with the general search engine 210.

Further, the data store 212 may store search results corresponding to one or more inputted search queries; the search results may be in the form of documents or Web pages (the terms "documents" and "Web pages" may be used interchangeably throughout the application). Further, the data store 212 is configured to store documents or Web pages in more than one language. For example, there may be an English language document store that stores Web pages comprised predominantly of the English language. As well, there may be a Chinese language document store that stores Web pages comprised predominantly of the Chinese language. English language Web page search results may be returned to the general search engine 210 in response to receiving an English language search query. Likewise, Chinese language Web page search results may be returned to the general search engine 210 in response to receiving a Chinese language search query. In one aspect, both English and Chinese language search results are returned to the general search engine 210. This aspect will be discussed in further depth below. Although only two languages are used for explanatory purposes, it is contemplated that any number of languages are within the scope of the invention.

The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the general search engine 210, the end-user computing device 214, and/or any combination thereof.

The end-user computing device 214 shown in FIG. 2 may be any type of computing device, such as, for example, the computing device 100 described above with reference to FIG. 1. By way of example only and not limitation, the end-user computing device 214 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof. As shown, the end-user computing device 214 includes a display screen 215. The display screen 215 is configured to present information, including Web pages and search engine pages to the user of the end-user computing device 214.

The system 200 is merely exemplary. While the general search engine 210 is illustrated as a single unit, it will be appreciated that the general search engine 210 is scalable. For example, the general search engine 210 may in actuality include a plurality of computing devices in communication with one another. Moreover, the data store 212, or portions thereof, may be included within, for instance, the general search engine 210 as a computer-storage medium. The single unit depictions are meant for clarity, not to limit the scope of embodiments in any form.

Before beginning a more detailed description of FIG. 2, a high-level overview of general search engines and vertical search engines is presented below. General search engines are configured to perform general Web searches over millions of documents. Representative examples of general search engines include Bing™, Yahoo®, and Google®. Further, a user can select different language settings for a general search engine. For example, the user can specify the language that should appear on the user interface of the general search engine and the language document source from which the search results should be culled. In general, only a single language is presented on the user interface of the general search engine, and searches are generally performed using a single language document source.

A general search engine stands in contrast to a vertical search engine. A vertical search engine searches for documents or Web pages associated with a specific industry, topic, type of content, language, piece of data, geographical location, and the like. The number of vertical search engines is myriad but some representative examples include PubMed®, Google® Scholar, Google® 2lingual, BizNar, and the like. Users who utilize vertical search engines exhibit specific intent to explore the topics associated with the vertical search engines. For example, a user would access PubMed® to retrieve references directed to life sciences and biomedical topics. A user would not access PubMed® to perform a Web search on, for example, types of cats. In another example, a user would access 2lingual to retrieve references culled from user-specified language sources.

Turning now to FIG. 2, the general search engine 210 comprises a receiving component 218, a determining component 220, an identifying component 222, a translation assistance component 224, and a rendering component 226. The general search engine 210 can be any general search engine similar to those described above. Further, a user of the general search engine 210 may have set the language settings so that the user's primary or native language is presented on user interfaces associated with the general search engine 210 and search results are drawn from a native language document source. However, these language settings may be overridden upon determining that the user has intent to have non-native language learning opportunities presented on the search engine results page associated with the general search engine 210.

In some embodiments, one or more of the components 218, 220, 222, 224, and 226 may be implemented as stand-alone applications. In other embodiments, one or more of the components 218, 220, 222, 224, and 226 may be integrated directly into the operating system of a computing device such as the computing device 100 of FIG. 1. It will be understood that the components 218, 220, 222, 224, and 226 illustrated in FIG. 2 are exemplary in nature and in number and should not be construed as limiting. Any number of components may be employed to achieve the desired functionality within the scope of embodiments hereof.

The receiving component 218 is configured to receive a search query inputted by a user. The search query may be composed of one or more words in the user's native language. Alternatively, the search query may be composed of one or more words in the user's native language and one or more words in a non-native language. The term "word" is meant to encompass both alphabet/language characters strung together to make a word and symbols (e.g., Chinese or Japanese symbols).

The receiving component 218 is further configured to receive a variety of user inputs. For example, the receiving component 218 may receive inputs concerning language settings associated with the general search engine 210. Other inputs may include a user selection of a bilingual mode on the general search engine results page. This aspect will be discussed further below.

The determining component 220 is configured to determine that the user has intent to have non-native language learning opportunities presented on the general search engine results page. As mentioned earlier, users of bilingual vertical search engines exhibit unequivocal intent to have non-native language search results presented. Intent with bilingual vertical search engines is shown by the user accessing the site and making explicit selections regarding language sources from which search results are drawn. Intent to have non-native language learning opportunities presented on a general search engine results page is more difficult to determine especially considering that the user has already set language setting to the user's native language.

Non-native language learning opportunities may include having both native language search results and non-native language search results simultaneously presented on the general search engine results page, having a non-native language dictionary definition of the search query presented on the home page, having a non-native language translation of the search query presented on the home page, and having translation tools available on the general search engine home page.

The determining component 220 determines that the user has intent to have learning language opportunities presented on the general search engine results page in several different ways. For example, the determining component 220 may receive an indication that the user has initiated a bilingual mode by selecting a bilingual mode option on the general search engine results page.

The determining component 220 may also determine user intent by determining that the user has utilized a language learning portal to assist the user in learning the non-native language, the language learning portal being utilized at a point in time previous to the receiving component 218 receiving the search query. The point in time may be predetermined such as within 15-30 days of receiving the search query. The determining component 220 may access a log of the user's interactions with the general search engine 210 (stored in association with the data store 212) to determine if the user has visited a language learning portal. For the purposes of this application, a language learning portal may be defined as a Web page or service that provides translation assistance or word definitions in native or non-native languages, and/or a vertical search engine that provides search results in one or more user-specified languages. Exemplary learning language portals include Google® Translate, Google® 2lingual, and Bing™ Translator.

The determining component 220 may also determine user intent by determining that the search query includes one or more words or symbols in a non-native language. As mentioned above, the search query may comprise one or more words or symbols in the native language and one or more words or symbols in a non-native language. Inputting a search query in this manner indicates that the user has a desire to practice non-native language learning skills.

In yet another aspect, the determining component 220 may determine user intent by analyzing the context of the received search query. The search query may be inputted using just native language words or symbols. However, the context of the query may indicate that the user has intent to learn more about the non-native language. By way of illustrative example, a Chinese user may input the following query, "different ways to learn English" in Chinese symbols. The context of the search query indicates that the Chinese user has intent to learn the English language. Based on this, the determining component 220 may determine that the user desires to have non-native language learning opportunities presented on the general search engine results page. Any and all such aspects are contemplated as being within the scope of the invention.

Further, once user intent has been determined, the determining component 220 may be further configured to determine a level of the user intent. For instance, the user may have very strong intent, strong intent, moderate intent, and the like. The level of intent may depend on, for example, how often the user has utilized a language learning portal in the past, or how frequently the user includes non-native language symbols or words when inputting a search query. By way of illustrative example, a user who selects the bilingual mode option may be determined to have very strong intent to have non-native language learning opportunities presented on the general search engine results page.

Once it has been determined that the user has intent to have non-native language learning opportunities presented on the general search engine results page, all future queries will have non-native language opportunities presented. This continues until the user explicitly turns off the bilingual mode by, for example, de-selecting the bilingual mode option on the general search engine results page.

The identifying component 222 is configured to identify and extract search results associated with search query. As mentioned, the data store 212 stores document sources in one or more languages. In one aspect, when the search query comprises all native language words or symbols, the identifying component 222 searches the native language document source to identify documents or Web pages related to the search query. In another aspect, the received search query comprised of all native language words or symbols is translated by, for example, the translation assistance component 224 to a second search query comprising all non-native language words or symbols. The identifying component 222 then searches the non-native language document source to identify search results associated with the second search query. By way of example, a Spanish user may input the search query "perro y gatto." Search results from the native language document source would be identified and returned. Further, upon determining that the Spanish user has intent to learn, for example, English, the search query "perro y gatto" would be translated by, for example, the translation assistance component 224 to the English search query "dog and cat." The identifying component 222 would perform a search of English language documents using the phrase "dog and cat."

In yet another aspect, when the search query comprises words in both the native language and the non-native language, the identifying component 222 searches both the native language document source and the non-native language document source to identify documents related to the search query. By way of illustrative example, suppose a Spanish user inputs the search query "perro y cats." The search query contains both Spanish words ("perro" and "y") as well as an English word ("cats"). The identifying component 222 searches the English language document source to see if there are search results corresponding to the phrase "perro y cats." Further, the search query "perro y cats" would be translated by, for example, the translation assistance component 224 to the native language search query, "perro y gatto." The identifying component 222 would then search the native language document source to identify Web pages related to the search query "perro y gatto." Any and all such aspects are contemplated as being within the scope of the invention.

The translation assistance component 224 is configured for a number of different things. For example, as mentioned above, the translation assistance component 224 is configured to translate a search query comprised of native language characters or symbols to a search query comprised of all non-native language characters or symbols. The translated search query may be presented on the general search engine results page as explained more fully below with respect to FIGS. 5-6. As well, the translation assistance component 224 may translate the search results. For example, a native-language search result may be translated to the non-native language; the native language search results would then be presented in conjunction with its translation. Likewise, a non-native language search result may be translated to the native language; the non-native language search result would be presented in conjunction with its translation.

The translation assistance component 224 is further configured to determine a dictionary definition of the search query in the non-native language. The dictionary definition may include one or more sample sentences that utilize terms in the search query. Further, the dictionary definition may include a pronunciation guide as well as an auditory presentation of the search query in the non-native language. The translation assistance component 224 is also configured to provide an on-demand hover translation tool. A user who is having difficulty understanding a non-native word or phrase on the general search engine results page may hover over the word or phrase and have a native language translation provided.

The rendering component 226 is configured to render the native language search results, the non-native language search results, dictionary definition results, and/or translation results on the general search engine results page utilizing both the native language and the non-native language. The rendering component 226 is configured to override user-specified language settings if it is determined that the user has intent to have non-native language learning opportunities presented on the general search engine results page.

In one aspect, the rendering component 226 renders the dictionary definition of the search query along with sample sentences near the top of the general search engine results page. Further, the translation of the search query into the non-native language may also be presented near the top of the results page—both the dictionary definition of the search query and the translation of the search query may be presented near the actual search query so that the user can relate the different items.

Continuing, the non-native language search results may be presented before the native language search results and may be demarcated in some way to indicate their identity. For example, a line may be used to separate the non-native language search results from the native language search results. Other ways known in the art may be used to highlight or emphasize the non-native language search results. Presenting the dictionary definition, translated search query, and non-native language search results near the top of the general search engine results page gives the user an opportunity to practice non-native language learning skills before proceeding to the sought-after search results in the native language. In some aspects, the dictionary definition and/or translated search query may not be presented. In one aspect, the dictionary definition and/or the translated search query may not be presented if the determining component 220 determines that the level of user intent is below a predetermined threshold. For instance, the dictionary definition and/or translated search query may not be presented if the determining component 220 determines that the user is exhibiting moderate intent. In another aspect, the dictionary definition may not be presented if no relevant dictionary item was found.

Figure 3:
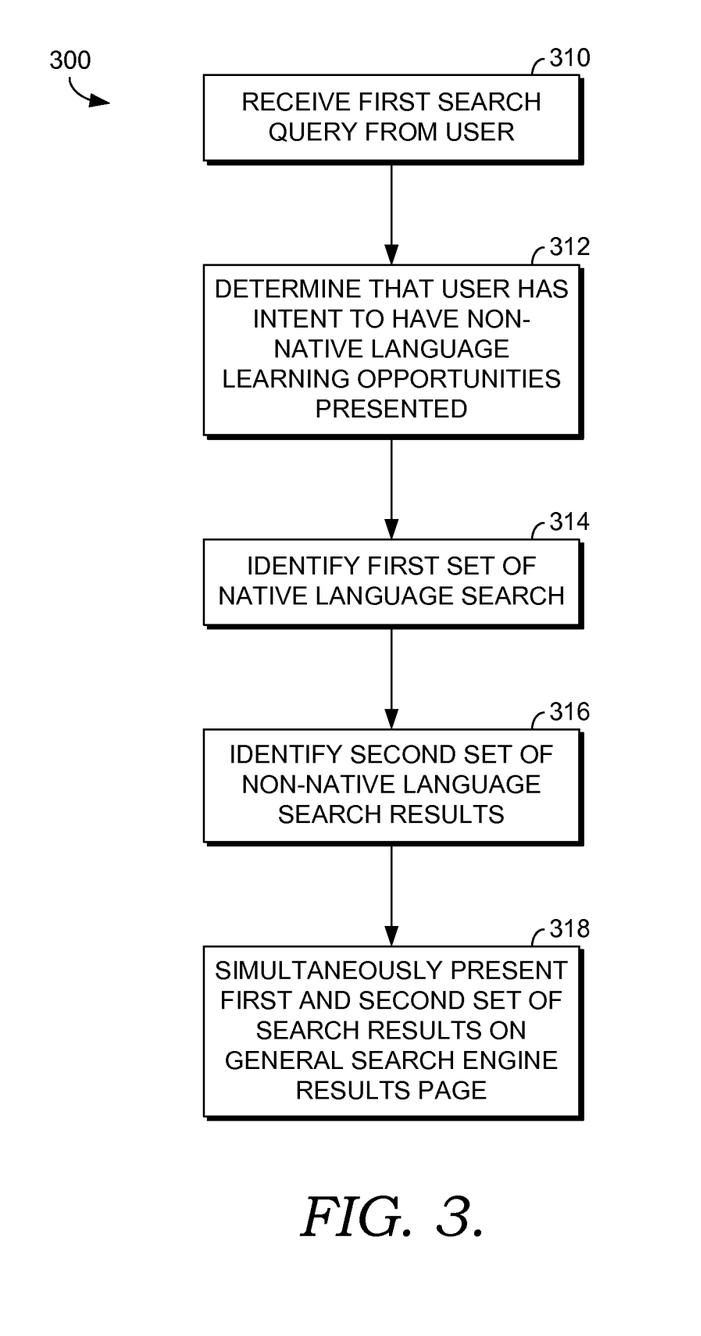
FIG. 3 is an exemplary flow diagram of a method for a native language user to learn a non-native language on a general search engine results page in accordance with an embodiment of the present invention.

Turning now to FIG. 3, a flow diagram is depicted of an exemplary method 300 of providing a native language user an opportunity to learn a non-native language on a general search engine results page. The method may be carried out by a general search engine with language settings set to the native language. The general search engine may be the general search engine 210 of FIG. 2. At a step 310, a first search query is received from the user; the first search query comprises at least one or more words or symbols in the native language.

At a step 312, it is determined that the user has intent to have non-native language learning opportunities presented on the general search engine results page in conjunction with standard search engine results in the native language. The determination may be made by, for example, a determining component such as the determining component 220 of FIG. 2. The non-native language learning opportunities may include a non-native language translation of the search query, a non-native language dictionary definition of the search query along with one or more non-native language sample sentences incorporating the search query, and a set of non-native language search results.

User intent may be determined upon receiving an indication that the user has initiated a bilingual mode. For example, a selectable option may be presented on the results page; the selectable option may be labeled "Bilingual Mode" in the native language or the non-native language. The user can select the option to initiate the presentation of non-native language learning opportunities on the general search engine results page.

User intent may also be found upon determining that the user has utilized a language learning portal at a point in time previous to the user inputting the search query. Language learning portals may include various translation tools and or bilingual vertical search engines. If the user utilized a language learning portal in the past to practice the non-native language, this is a good indication that the user desires to have additional non-native language learning opportunities presented to him or her. In one aspect, the language learning portal was utilized within a predetermined time prior to receiving the search query. For example, the language learning portal was utilized within the previous 15-30 days of receiving the search query from the user.

Additionally, user intent may be found upon determining that the first search query comprises one or more words composed of non-native language characters or symbols. In another aspect, user intent may be found upon analyzing the context of the first search query. The context may indicate that the user has a strong interest in learning a non-native language.

At a step 314, a first set of native language search results associated with the first search query is identified by an identifying component such as the identifying component 222 of FIG. 2. The first set of native language search results is identified using content from a native language document source. At a step 316, a second set of non-native language search results associated with the first search query is also identified. The second set of non-native language search results may be identified after the first search query is translated into a second search query composed of non-native language words or symbols, and the non-native language search query is used to identify search results using content from a non-native language document source.

At a step 318, the first and second sets of search results are simultaneously presented on the general search engine results page by a rendering component such as the rendering component 226 of FIG. 2. The first and second sets of search results may be presented in conjunction with the dictionary definition of the first search query, and/or the translation of the first search query in the non-native language. The dictionary definition may be presented with a selectable icon. Upon the user selecting the icon, an audio pronunciation of the first search query in the non-native language may be initiated.

Figure 4:
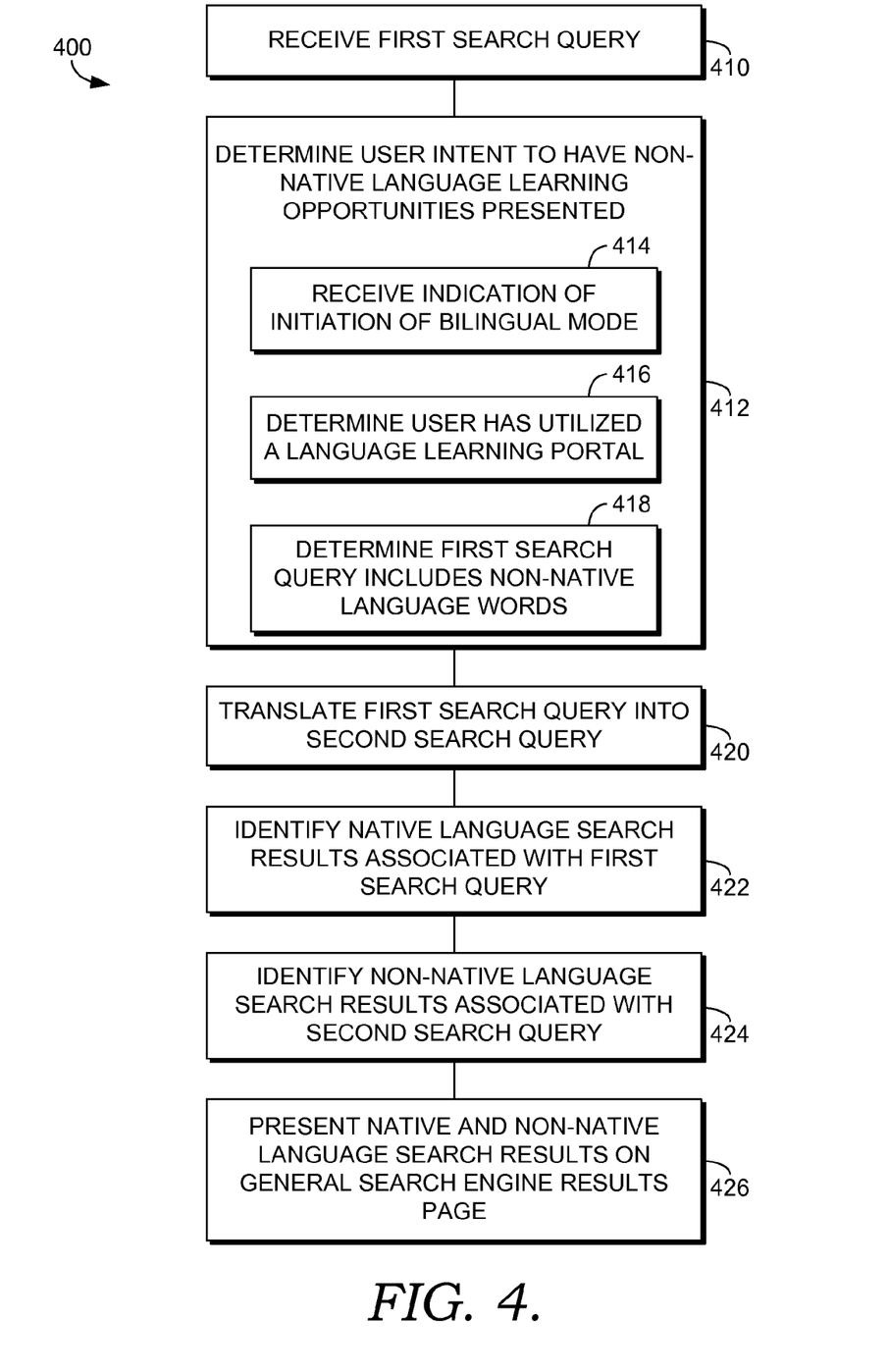
FIG. 4 is an exemplary flow diagram of a method for determining that a native language user has intent to be presented with language learning opportunities on a general search engine results page in accordance with an embodiment of the present invention.

Turning to FIG. 4, a flow diagram is depicted of an exemplary method 400 of determining user intent to have non-native language learning opportunities presented on a general search engine results page. The method 400 may be carried out by a general search engine such as the general search engine 210 of FIG. 2; the general search engine may have language setting specifying a native language. At a step 410, a first search query is received. The first search query may comprise one or more words composed of native language characters or symbols.

At a step 412, it is determined that the user has intent to have non-native language learning opportunities presented on the general search engine results page. The determining may comprise, at a step 414, receiving an indication that the user has initiated a bilingual mode on the general search engine results page by, for example, selecting a bilingual mode option. The determining may also include, at a step 416, determining that the user has utilized a language learning portal to help learn the non-native language. Additionally, the determining may comprise, at a step 418, determining that the first search query includes one or more words composed of non-native language characters or symbols. Steps 414, 416, and 418 are all strong signals that the general search engine can use to infer that the user has intent to learn the non-native language.

At a step 420, the first search query is translated into a second search query comprised only of one or more words in non-native language characters or symbols. The translation may be carried out by a translation assistance component such as the translation assistance component 224 of FIG. 2. The second search query may be presented on the general search engine results page in conjunction with the first search query so that the user can view a side-by-side comparison of the native language query and the non-native language query.

At a step 422, a first set of native language search results associated with the first search query is identified using content from a native language document source. At a step 424, a second set of non-native language search results associated with the second search query is identified using content from a non-native language document source. At a step 426, the first and second sets of search results are simultaneously presented on the general search engine results page. The search results may be presented in conjunction with the second search query and a non-native language dictionary definition of the first search query.

Figure 5:
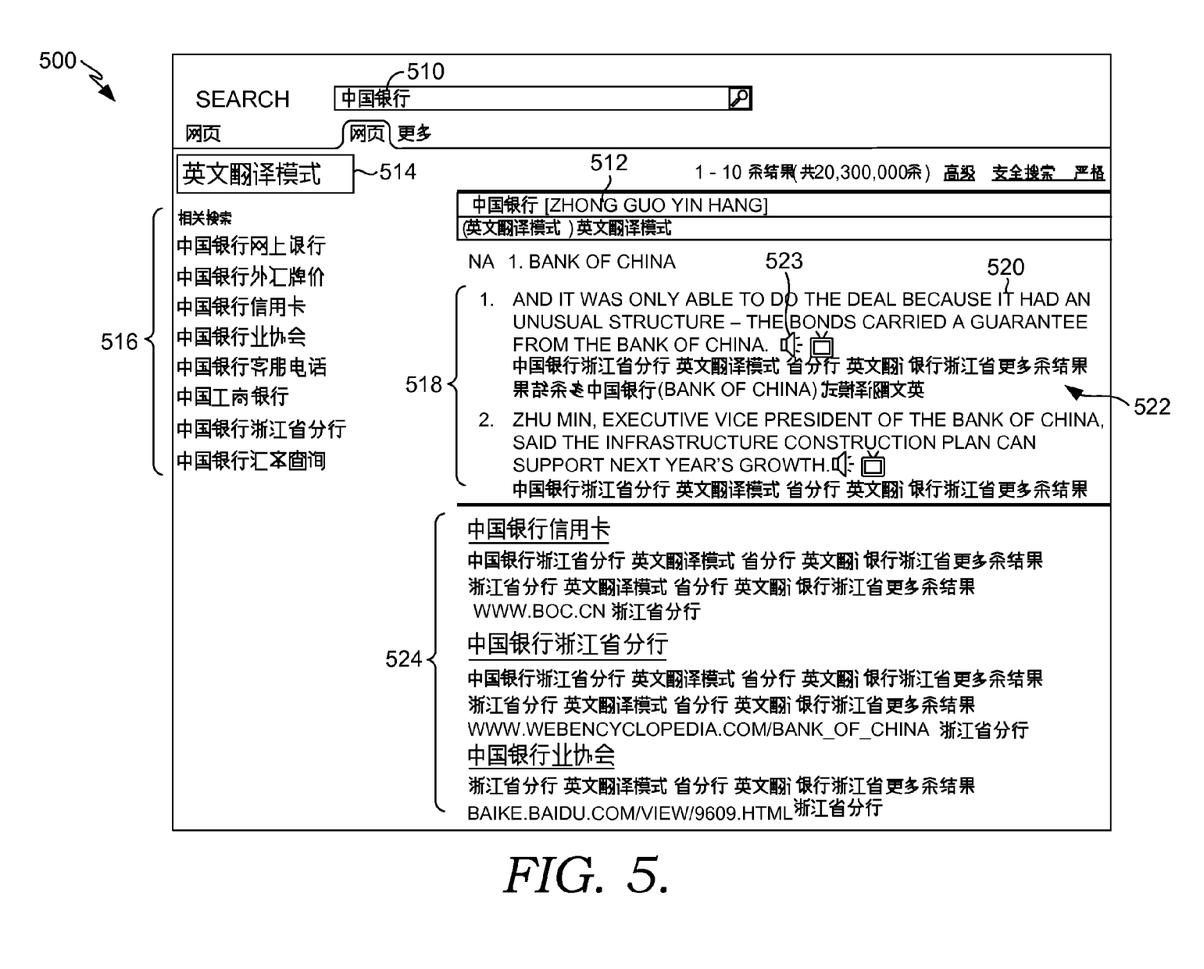
FIGS. 5-6 are exemplary user interfaces illustrating a general search engine results page presenting language learning opportunities in accordance with an embodiment of the present invention.
Figure 6:
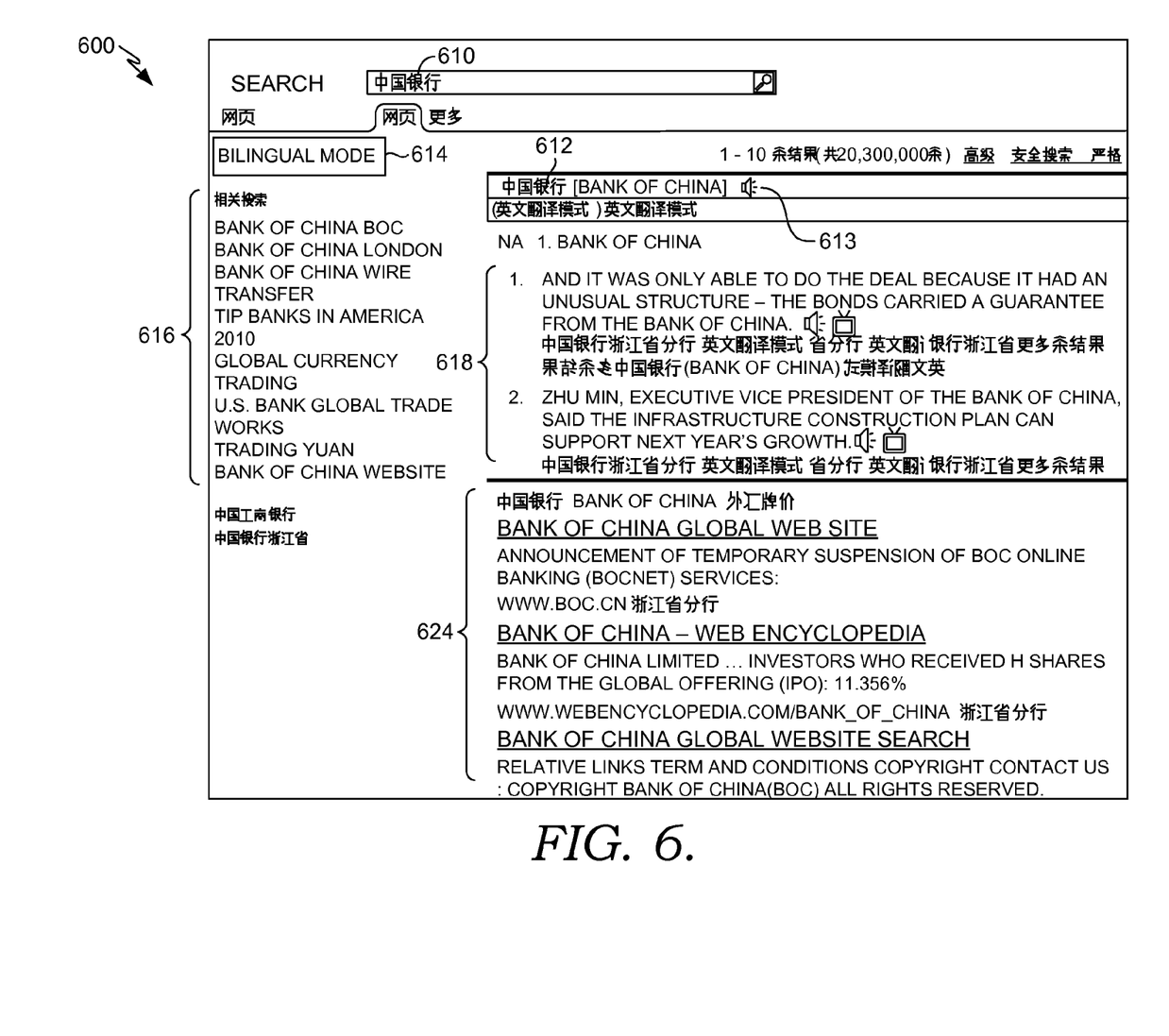

Turning now to FIGS. 5 and 6, FIGS. 5 and 6 depict exemplary graphical user interfaces (GUIs) configured to simultaneously present native language search results and non-native language search results on a general search engine results page. The differences between FIGS. 5 and 6 are dependent upon user settings regarding how much of the content is presented in the non-native language. With respect to FIG. 5, FIG. 5 depicts a GUI 500. The GUI 500 is associated with a general search engine that has a language setting of Chinese. The GUI 500 includes a search query input area 510 where a user (e.g., a Chinese user) can input a search query using for example Chinese language symbols or a combination of Chinese language symbols and non-native language words.

The GUI 500 further includes a translation result display area 512. In this case, the user has specified through one or more user settings that the translation of the search query constructed using Chinese symbols should be in the Chinese language. The user may also choose to have the translation of the search query be in the non-native language. Thus, through different user settings, the user has a degree of control over how much content on the general search engine results page should be in the native language and how much content should be in the non-native language.

The GUI 500 also includes a bilingual mode selection area 514 configured to present a selectable "Bilingual Mode" option in either the native language (as shown) or the non-native language. Selection of the option initiates the presentation of non-native language elements on the general search engine results page. Further, de-selection of the option terminates the presentation of the non-native language elements on the results page.

A related search list is presented in the related search area 516. Again, the user can adjust settings so that the related search list is presented in the native language (as shown) or the non-native language. The GUI 500 also comprises a bilingual search result area 518 configured to present a first set of search results in the non-native language. The first set of search results corresponds to the received search query and is culled from the non-native language document source. The bilingual search result area presents one or more search results. Each search result may be presented in the non-native language (see element 520) and the native language (see element 522). The bilingual search result area may include one or more selectable icons 523. The user can select the icon 523 to initiate play of an audio snippet that correctly pronounces the search query in the non-native language.

The GUI 500 further includes a native language search result area 524 configured to present a second set of search results in the native language; the second set of search results is also associated with the received search query and is drawn from the native language document source. Depending on user settings, the search results in the native language search result area 524 may be presented in the native language. Alternatively, the search results may be presented in native and non-native languages or just the non-native language.

FIG. 6 depicts a second GUI 600. The GUI 600 is very similar to the GUI 500 but, because of different user settings, has a higher percentage of content in the non-native language. The GUI 600 includes a search query input area 610 configured to receive a search query from a user. Like above, the user is Chinese and has inputted a search query using Chinese symbols. The GUI 600 further includes a translation result display area 612 that presents the search query and its non-native language translation (e.g., "Bank of China"). The translation result display area 612 also has a selectable icon 613 that, when initiated, presents an audio pronunciation of the search query in the non-native language.

The GUI 600 has a bilingual mode selection area 614. In this case, the user settings specify that non-native language be used with respect to the bilingual mode option. The related search area 616 presents related searches in the non-native language. Similar to the GUI 500, a bilingual search result area 618 presents search results culled from the non-native language document source. The search results are presented in both English and Chinese. A native language search result area 624 presents search results culled from the native language document source. Like the related search area 616, user settings specify that the results be presented in the non-native language.

Both the GUI 500 and the GUI 600 include on-demand translation tools. For example, the user may hover over a non-native word and a display will be initiated with the native language translation. In one aspect, on-demand audio presentations of correct pronunciations of non-native words may be initiated by hovering or selecting the non-native word. Any and all such aspects are contemplated as being within the scope of the invention.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer storage devices having embodied thereon computer-executable instructions that, when executed by a general search engine, perform a method for a native language user (the "user") to learn a non-native language by having non-native language learning opportunities presented on a general search engine results page associated with the general search engine, wherein the user has specified via one or more settings that only the native language be presented on the general search engine results page associated with the general search engine and that only native language document sources be searched by the general search engine, the method comprising:

receiving a first search query from the user, the first search query comprising at least one or more words comprised of characters or symbols associated with the native language;

determining that the user has implicit intent to have the non-native language learning opportunities presented on the general search engine results page based solely on one or more features associated with the first search query or an online history associated with the user;

accessing a first data store having documents in the native language and identifying a first set of native language documents associated with the first search query;

overriding the user's specification that the general search engine search only native language document sources and accessing a second data store having documents in the non-native language and identifying a second set of non-native language documents associated with the first search query; and overriding the user's specification that only the native language be presented on the general search engine results page and simultaneously presenting the first and second sets of documents as a first and a second set of search results on the general search engine results page, the first and second sets of search results presented in the native language and the non-native language respectively.

2. The devices of claim 1, wherein the determining that the user has implicit intent to have the non-native language learning opportunities presented on the general search engine results page comprises at least one of:

determining that the user has utilized a language learning portal in association with the non-native language at a point previous in time to the receiving of the first search query from the user; or determining that the first search query further comprises one or more words comprised of characters associated with the non-native language.

3. The devices of claim 2, wherein the native language was also utilized in association with the language learning portal.

4. The devices of claim 2, further comprising:
translating the first search query into a second search query, the second search query including one or more words composed only of characters associated with the non-native language; and
presenting the second search query on the general search engine results page.

5. The devices of claim 1, further comprising:
presenting a dictionary definition of the first search query on the general search engine results page, the dictionary definition presented in the non-native language.

6. The devices of claim 5, further comprising:
presenting a selectable icon in association with the dictionary definition of the first search query;
receiving a selection of the selectable icon; and
initiating play of an audio pronunciation of the first search query in the non-native language.

7. A computerized method carried out by a general search engine having one or more processors for a native language user (the "user") to have non-native language learning opportunities presented on a general search engine results page, wherein the user has specified via one or more settings that only the native language be presented on the general search engine results page and that only native language document sources be searched by the general search engine, the method comprising:
receiving a first search query from the user, the first search query comprising at least one or more words comprised of characters in the native language;
determining that the user has implicit intent to learn the non-native language based solely upon at least one of:
(1) determining that the user has utilized a language learning portal in association with the non-native language at a point previous in time to the receiving of the first search query from the user, or
(2) determining that the first search query further comprises one or more words comprised of characters in the non-native language;
translating the first search query into a second search query, the second search query comprised only of one or more words in the non-native language characters;
accessing a first data store having documents in the native language and identifying a first set of native language documents associated with the first search query;
overriding the user's specification that the general search engine search only native language document sources and accessing a second data store having documents in the non-native language and identifying a second set of non-native language documents associated with the second search query; and
overriding the user's specification that only the native language be presented on the general search engine results page and simultaneously presenting the first and second sets of documents as a first and a second set of search results on the general search engine results page, the first and second sets of search results presented in the native language and the non-native language respectively.

8. The method of claim 7, wherein the native language is the primary language of the user.

9. A system for having non-native language learning opportunities presented on a general search engine results page associated with a general search engine, wherein a user has specified via one or more settings that only the user's native language be presented on the general search engine results page and that only native language document sources be searched by the general search engine, the system comprising:
a computing device associated with the general search engine having one or more processors and one or more computer-storage media; and
a data store coupled to the computing device,
wherein the general search engine:
receives a search query from the user, the search query comprising one or more words comprised of characters or symbols associated with the native language;
without the user making an explicit selection, determines that the user has implicit intent to have the non-native language learning opportunities presented on the general search engine results page;
accesses a first data store having documents in the native language and identifies a first set of native language documents associated with the search query;
overrides the user's specification that the general search engine search only native language documents sources and accesses a second data store having documents in the non-native language and identifies a second set of non-native language documents associated with the search query; and
overrides the user's specification that only the native language be presented on the general search engine results page and communicates for presentation on the general search engine results page the first and second sets of documents as a first and a second set of search results, the first and second sets of search results presented in the native language and the non-native language respectively.

10. The system of claim 9, wherein the computing device further communicates for presentation on the general search engine results page a translation of the search query in the non-native language.

11. The system of claim 9, wherein the computing device further communicates for presentation on the general search engine results page a dictionary definition of the search query in the non-native language.

12. The system of claim 9, wherein the computing device further communicates for presentation on the general search engine results page a translation of the second set of search results in the native language.

13. The system of claim 9, wherein the first and second sets of search results are presented simultaneously on the general search engine results page.

* * * * *